Nov. 24, 1964

JAMES E. WEBB
ADMINISTRATOR OF THE NATIONAL
AERONAUTICS AND SPACE
ADMINISTRATION 3,158,764

TWO-FLUID MAGNETOHYDRODYNAMIC SYSTEM AND METHOD FOR
THERMAL-ELECTRIC POWER CONVERSION

Filed July 25, 1962

INVENTOR.
DAVID G. ELLIOTT
BY
ATTORNEYS

Nov. 24, 1964

JAMES E. WEBB
ADMINISTRATOR OF THE NATIONAL
AERONAUTICS AND SPACE
ADMINISTRATION
TWO-FLUID MAGNETOHYDRODYNAMIC SYSTEM AND METHOD FOR
THERMAL-ELECTRIC POWER CONVERSION 3,158,764

Filed July 25, 1962

INVENTOR.
DAVID G. ELLIOTT
BY
ATTORNEYS

United States Patent Office 3,158,764
Patented Nov. 24, 1964

3,158,764
TWO-FLUID MAGNETOHYDRODYNAMIC SYSTEM AND METHOD FOR THERMAL-ELECTRIC POWER CONVERSION
James E. Webb, Administrator of the National Aeronautics and Space Administration, with respect to an invention of David G. Elliott
Filed July 25, 1962, Ser. No. 212,496
11 Claims. (Cl. 310—11)

This invention relates to a two-fluid magnetohydrodynamic system for thermal-electric power conversion, and included in the objects of this invention are:

First, to provide a system of this class which avoids the use of mechanical moving parts by utilizing a gas-drive jet pump, such as illustrated in United States Letters Patent No. 3,031,977, issued May 1, 1962, to cause high velocity flow of a liquid metal through a magnetic field so as to generate electrical energy.

Second, to provide a system of this class wherein two working fluids are employed, one a gas for the thermal-to-kinetic conversion and the other a conducting liquid, such as molten metal, for kinetic-to-electric conversion, whereby the system is capable of operating at a materially lower temperature than is possible with a single fluid magnetohydrodynamic system.

Third, to provide a system of this class wherein a liquid metal and gas mixture is caused to expand through a nozzle so that kinetic energy is imparted to the liquid metal, and wherein the high velocity liquid metal is immediately separated from the gas and caused to flow between pole pieces in such a manner as to establish current flow through the liquid which may be withdrawn as electrical energy.

Fourth, to provide a system of this class wherein in one embodiment the liquid-gas mixture is separated by reason of impingement on a deflecting surface in such a manner that the liquid consolidates into a film flowing over the surface and through a capture slot from which the gas is excluded.

Fifth, to provide a system of this class wherein in another embodiment the liquid-gas mixture is caused to circulate in an essentially cylindrical chamber from which the gas is withdrawn through a porous wall and the liquid is withdrawn through a capture slot, in this case the circulating mixture being exposed to a magnetic field so that electrical energy is generated in the mixture.

With the above and other objects in view, as may appear hereinafter, reference is directed to the accompanying drawings in which.

Figure 1:
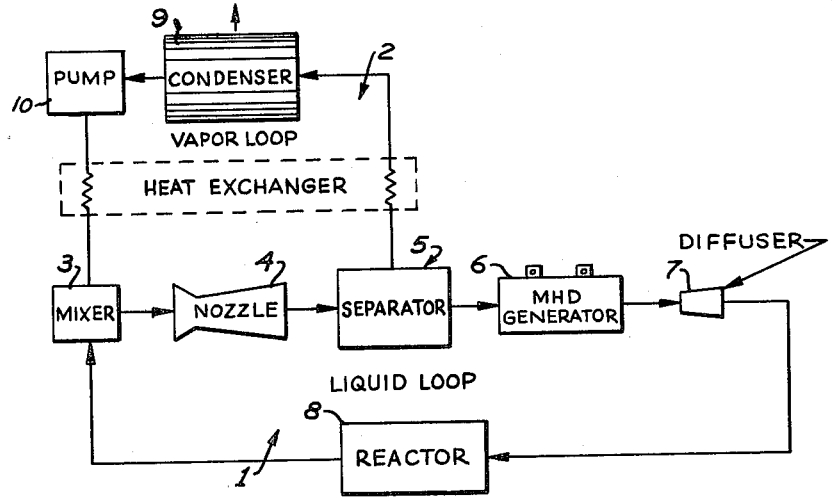
FIGURE 1 is a block diagram showing a two-fluid system embodying the invention.

Reference is first directed to FIGURE 1. The two-fluid magnetohydrodynamic system for thermal-electric power conversion here illustrated involves a liquid loop 1 through which a metal in a liquid state circulates, and a vapor loop 2 through which a gas or vapor circulates. These loops share in common a mixer 3, a nozzle 4, and a separator 5. The liquid on leaving the separator 5 passes through a magnetohydrodynamic generator 6, a diffuser 7, a heat source such as nuclear reactor 8, and returns to the mixer 3.

The vapor on leaving the separator 5 passes through a condenser 9, a pump, such as an electromagnetic pump, 10, and is returned to the mixer 3. A heat exchanger 11 may be interposed in the vapor cycle to raise the cycle efficiency by using the superheat of the separated vapor to preheat the condensate before entering the mixer 3. While the reactor is shown in the liquid loop 1, it may be incorporated in the vapor loop 2.

Figure 2:
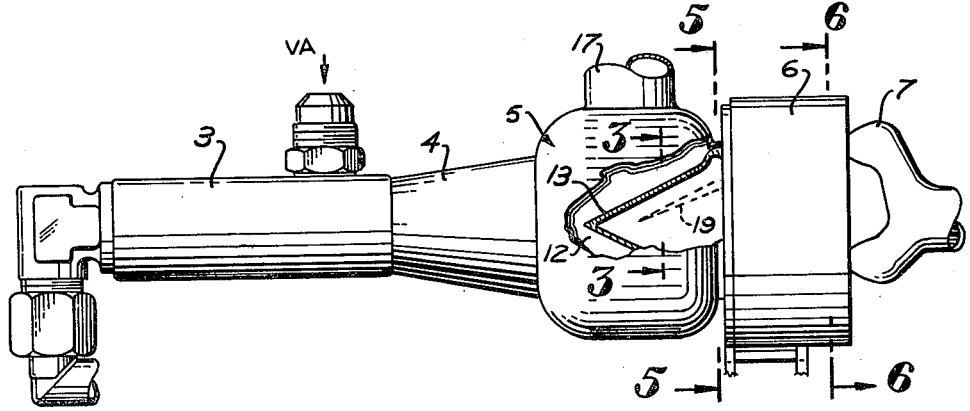
FIGURE 2 is a fragmentary, substantially diagrammatical, side view showing the nozzle, separator, and magnetohydrodynamic generator employed in the system, with portions broken away and in section.
Figure 3:
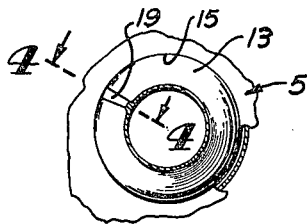
FIGURE 3 is a fragmentary, transverse, sectional view taken through 3—3 of FIGURE 2, showing particularly the separator cone.

The mixer 3, nozzle 4, separator 5, magnetohydrodynamic generator 6, and diffuser 7 are all incorporated in one unit illustrated in FIGURE 2. The mixer, nozzle, and separator, per se, are more fully shown and described in Patent No. 3,031,977, issued May 1, 1962, entitled "Gas-Drive Jet Pump."

With reference to FIGURES 2 through 7, the walls of the nozzle 4 merge into a separator chamber 12 in which is mounted a separator cone 13 centered with respect to the nozzle 4. The base or larger end of the separator cone 13 flares outwardly, as indicated by 14 and shown best in FIGURE 7, and discharges into a capture slot 15. An annular lip 16 forms the radially outer wall of the capture slot 15, and the surface of the separator chamber 12 radially outward of the lip 16 defines a portion of a toroid.

As will be described in more detail hereinafter, a mixture of propelling vapor and conductive liquid impinges on the separator cone 13. The liquid forms a moving film on the separator cone which flows into the capture slot 15, whereas the vapor or gas separates from the liquid and exhausts from the separator chamber 12 through a side outlet 17.

Figure 4:
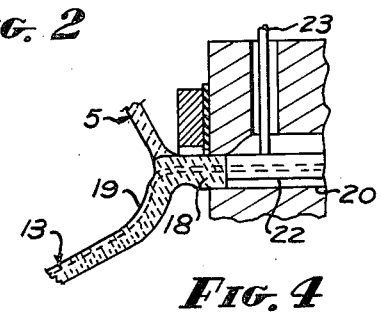
FIGURE 4 is a fragmentary, sectional view taken through 4—4 of FIGURE 3.
Figure 5:
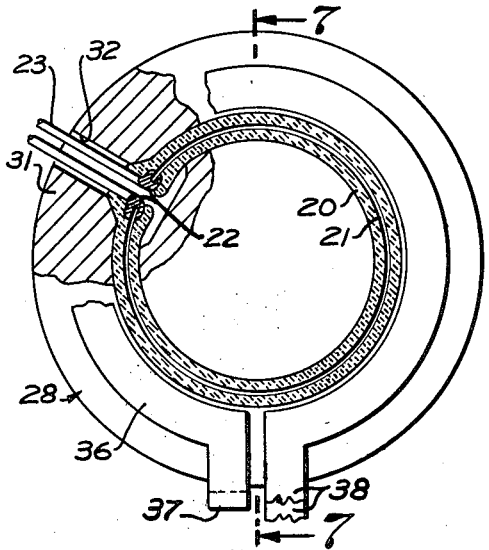
FIGURE 5 is a transverse, sectional view taken through 5—5 of FIGURE 2 with portions shown in elevation.
Figure 6:
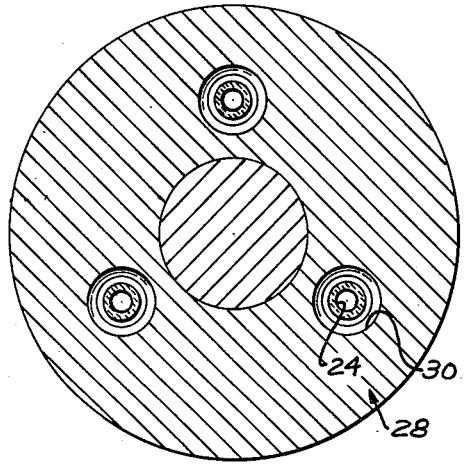
FIGURE 6 is a transverse, sectional view through 6—6 of FIGURE 2.
Figure 7:
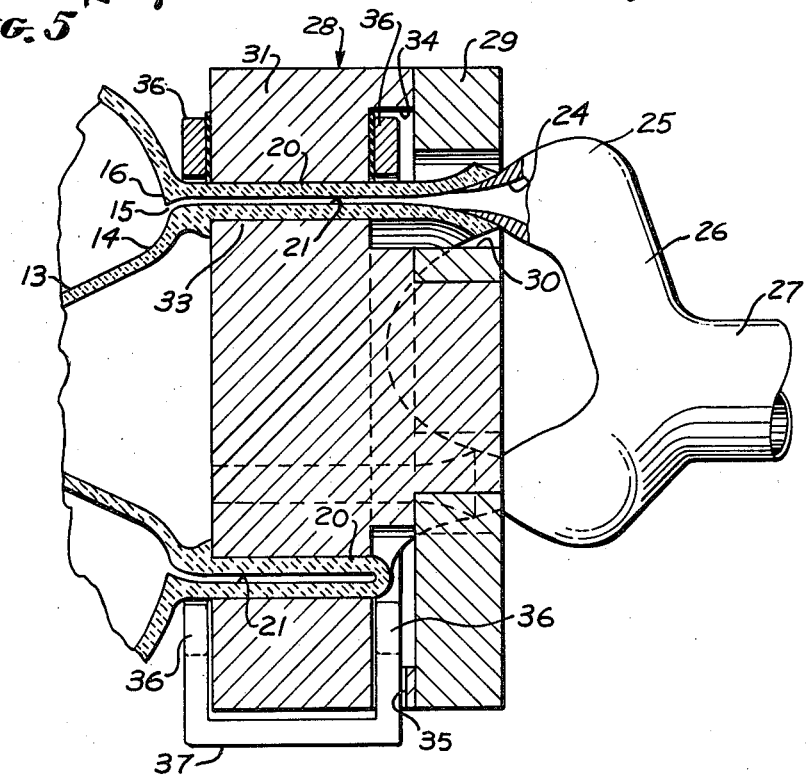
FIGURE 7 is an enlarged, fragmentary, longitudinal, sectional view taken through 7—7 of FIGURE 5, showing particularly the magnetohydrodynamic generator.

The capture slot 15 is not a complete circle, but, instead, the ends of the slot are separated by a wall 18 indicated in FIGURE 4. Formed on one side of the separator cone 13, in registry with the wall 18, is a diverging rib 19 which divides the liquid so that it does not form a complete annulus.

The liquid discharge end of the separator chamber 12 is joined to a flow ring 20 in the form of a split cylinder, having therein a flow passage 21 also in the form of a split cylinder. The confronting walls of the flow passage 21 are relatively close together. The cross sectional area of the flow passage 21 is, however, sufficient to accomodate the full flow of the liquid which enters the capture slot 15.

The separator cone 13 and the flow ring 20 are formed of insulating material capable of withstanding high temperature. The extremities of the flow ring 20, behind the wall 18, are fitted with conductor bars 22 which are connected to output leads 23. The liquid metal flowing through the passage 21 forms, electrically, a single convolution split coil joined at its circumferential ends to the conductor bars 22.

The end of the flow ring 20 axially distal from the capture slot 15 merges into an annular set of diffuser inlets 24, each of which continues axially and is joined to a diffuser 25 corresponding to the diffuser 7, indicated diagrammatically in FIGURE 1. The diffusers in turn are joined to a common manifold 26, which in turn is joined to a discharge duct 27 that leads in turn to the reactor 8.

The flow ring 20 is surrounded externally and internally by a magnet 28 which includes a body portion 29. The body portion is provided with diffuser clearance openings 30, and includes an external pole piece 31 which surrounds the radially outer side of the flow ring 20. The external pole piece 31 is provided with a conductor clearance opening 32. Also extending from the body portion 29 is an internal pole piece 33 which confronts the radially inner side of the flow ring 20.

An annular solenoid bar cavity 34 is formed between the external pole piece 31 and the body and is provided with a solenoid lead clearance opening 35. A pair of solenoid bars 36, each representing a partial turn, are disposed at the axial ends of the external pole piece 31. The solenoid bars 36 are connected in series by a conductor 37, and the remaining extremities are provided with solenoid leads 38.

The two-fluid magnetohydrodynamic system illustrated in FIGURES 1 through 7 operates as follows:

Various metals may be used in the liquid loop. For example: lithium, aluminum, mercury, posassium, or sodium.

Various substances may be used in the vapor loop. For example: sodium, potassium, mercury or steam.

It is essential that the propelling medium used in the vapor loop have high vapor pressure and the liquid metal a low vapor pressure at the maximum temperature of the liquid metal as maintained in the liquid loop so that the propelling medium may vaporize fully in the mixer and separate completely in the separator. Also the melting point of the liquid metal should be above the minimum temperature of the propelling medium as maintained in the vapor loop to prevent condensation of any liquid metal carried over to the vapor loop.

The vapor condensate and the liquid metal, after the liquid metal has been heated in the reactor 8, enters the mixer 3, and the resulting mixture is discharged from the nozzle 4. The temperature in the mixer 3 is such that the propelling medium is vaporized, and consequently expands and is accelerated; and therefore accelerates the liquid metal medium so that the mixture discharges against the separator cone 13 at high velocity. The liquid medium forms a liquid film on the separator cone 13 which travels toward the base of the separator cone and into the capture slot 15, whereas the vapor or propelling medium separates from the film and discharges through the outlet 17. On its return to the mixer 3, the propelling medium is condensed in the condenser 9.

The molten metal or liquid medium continues at high velocity through the flow passage 21 within the magnetic field so that an electric current is generated within the molten metal. The resulting electrical energy is removed through the output leads 23. A portion of this energy is utilized to energize the solenoid bars 36. While partial turn solenoid bars are illustrated, multiple turn solenoid windings may be used.

The molten metal loses its velocity in the diffuser 25, thereby achieving sufficient pressure to return to the mixer 3.

It will thus be seen that the liquid medium remains in a liquid state throughout the liquid loop 1, and is used only for the kinetic-to-electric conversion portion of the cycle. The propelling or vapor medium performs the thermal-to-kinetic conversion portion of the cycle. As a consequence, the maximum temperatures required are substantially below that which would be required if a single fluid were used in a magnetohydrodynamic system. That is, if a single working fluid were used, it would be necessary that the working fluid be a gaseous conductor. This is possible only when the temperatures are above 4,000° F. With the system herein described, the working temperatures of the system may be in the range of 2,000° F. or below, depending upon the metal used. Of course, high working temperatures may be employed, if desired, by suitable choice of working fluids.

For purposes of illustration, but not by way of limitation, a conversion system employing potassium in the vapor loop 2 and lithium in the liquid loop 1 is described:

A 510-lb./sec. lithium spray leaves the 9.7-in.-diameter nozzle exit at 380 ft./sec., impinges on the separator cone 13, and enters the capture slot 15 at 350 ft./sec. ($V_1$) (assuming 15% kinetic energy loss). With the capture slot on a 12 in. diameter, the entering lithium film is 0.2 in. thick.

The lithium then enters the generator duct or flow passage 21 between the poles of an electromagnet 28 which impose a radial field. Assuming a 13-in. generator duct diameter and a 2-in. gap occupied by the conductors 22 and leads 23, the circumference of the duct is $$c = 13\pi - 2 = 39 \text{ in. } (100 \text{ cm.})$$

The velocity of the lithium leaving the generator duct is $V_2 = 234$ ft./sec. (7140 cm./sec.) for an assumed pressure rise from 16 p.s.i.a. to 160 p.s.i.a. in a 90% efficient diffuser. Assuming a field strength of $B = 20{,}000$ gauss at the duct exit, the E.M.F. generated there is:

$$E = \frac{BcV_2}{10^8}$$

$$= 10^{-8} \times 20{,}000 \times 100 \times 7140$$

$$= 143 \text{ volts}$$

The force required to slow the 510 lb./sec. of lithium from 350 ft./sec. ($V_1$) to 234 ft./sec. ($V_2$) is:

$$F = \dot{m}(V_1 - V_2)$$

$$= \frac{510(350 - 234)}{32.2}$$

$$= 1840 \text{ lbf.}$$

$$= 8.23 \times 10^8 \text{ dynes}$$

Assuming the field strength varies from 13,000 gauss at the duct entrance to 20,000 gauss at the exit, in order to maintain the same voltage throughout the duct, the current required to produce this force on the liquid is:

$$I = \frac{10F}{\overline{B}c}$$

$$= \frac{10 \times 8.23 \times 10^8}{16{,}500 \times 100}$$

$$= 4990 \text{ amperes}$$

where $\overline{B}$ is the average field strength of 16,500 gauss.

With no losses, the electric output power of the generator would be $EI = 714$ kw. From this must be deducted (1) the $I^2R$ losses in the fluid, (2) the power shunted across the duct walls and fluid outside the field, (3) hydraulic losses, and (4) the magnet power.

The electrical resistivity of lithium at the temperatures of interest—2000° F. and below—is estimated to be $1.2 \times 10^{-4}$ ohm·cm. at most. The generator duct flow thickness is 0.30 in.; assuming a 2-in. axial duct length, the current-carrying area of the lithium is $A = 0.60$ in.$^2 = 3.87$ cm.$^2$. The resistance of the fluid is therefore:

$$R = \frac{1.2 \times 10^{-4} \bar{c}}{A}$$

$$= \frac{1.2 \times 10^{-4} \times 82.5}{3.87}$$

$$= 0.0026 \text{ ohm}$$

Hence the IR voltage drop across the lithium is $4990 \times 0.0026 = 13$ volts, giving an actual output voltage of $E_0 = 143 - 13 = 130$ volts, and an $I^2R$ loss of $4.99 \times 13 = 65$ kw.

Assuming fully-developed pipe flow in the generator, the hydraulic loss is estimated to be 50 kw.

The area covered by the magnetic field is $39 \times 2 = 78$ in.$^2$, and the required gap is about 1.0 in. Conventional laboratory magnets producing a 20,000-gauss field across such a gap require a power of about 250 watts per square inch of coverage. Based on this figure the magnet power for the conversion system is 78×0.25=20 kw.

The I²R, hydraulic, and magnet losses total 135 kw., giving a generator output of 714—135=579 kw. The net electric output of the conversion system is the output of the generator minus the power required by the condensate pump in the vapor loop. For the system selected as an example, 5.1 lb./sec. of liquid potassium is raised from 6 p.s.i.a. to 160 p.s.i.a., producing a fluid power of 3.6 kw. With a pump efficiency of 50%, the input power is 7.2 kw., only 1.2% of the generator output.

It should be noted that the temperatures in the vapor loop 2 are maintained high enough to avoid solidification of the liquid medium which may be carried into the vapor loop 2 with the vapor.

Figure 8:
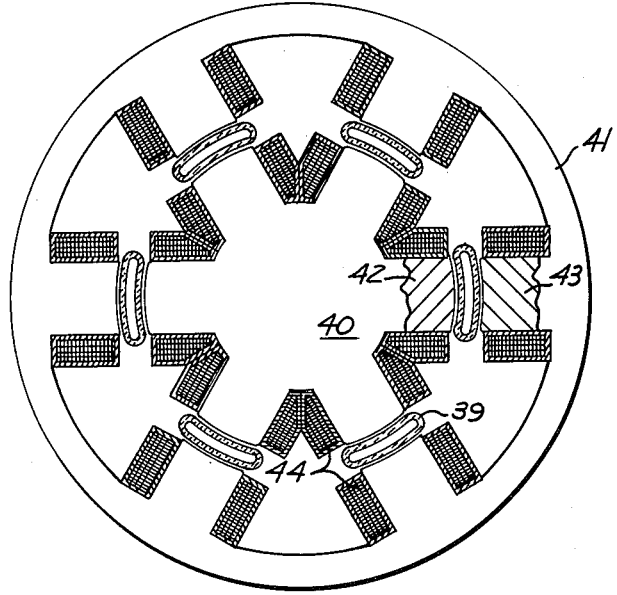
FIGURE 8 is a transverse, sectional view similar to FIGURE 5, showing a modified form of the magnetohydrodynamic generator.

Reference is directed to FIGURE 8. In the construction here illustrated, the liquid metal is separated into several paths. That is, the capture slot 15 discharges into a plurality of flattened flow tubes 39, each of which in turn discharges into a diffuser (not shown). The tubes 39 may be electrically connected in series, circumferentially, or may be provided with separate output conductors. In either case, the flow tubes 39 pass through a magnet with an inner section 40 and an outer section 41 having confronting sets of pole pieces 42 and 43. Either or both sets of pole pieces may be provided with solenoid coils 44 for the purpose of establishing magnetic flux across the liquid metal flowing in the tubes 39.

Figure 9:
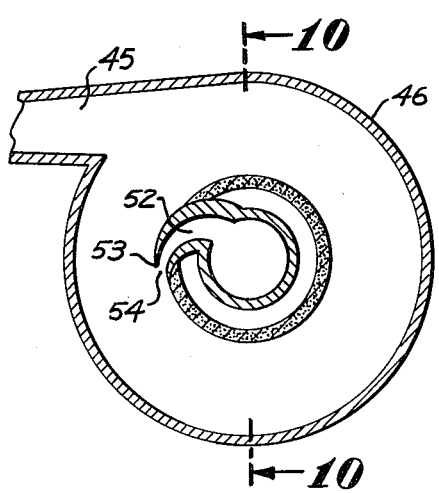
FIGURE 9 is a transverse, sectional view taken through 9—9 of FIGURE 10, showing a further modified form of the magnetohydrodynamic generator.
Figure 10:
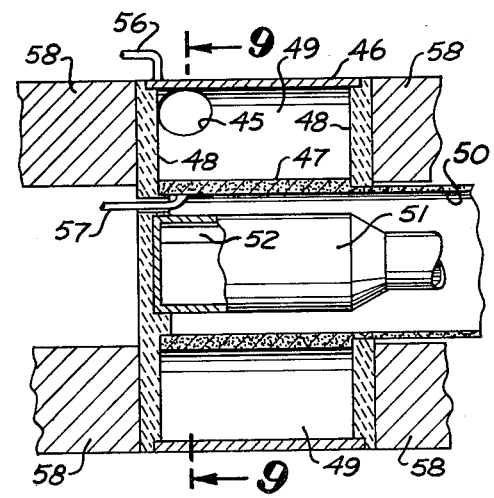
FIGURE 10, is a fragmentary, longitudinal, sectional view thereof taken through 10—10 of FIGURE 9.

Reference is now directed to FIGURES 9 and 10. In this construction a nozzle 45, corresponding to the nozzle 4, discharges tangentially into an outer cylinder 46. Centered within the outer cylinder 46 is an inner cylinder 47. The two cylinders are connected at their axial ends by end plates 48 formed of insulating material capable of withstanding high temperatures. The cylinders 46 and 47 with their end plates 48 form a cylindrical chamber 49. The inner cylinder 47 is porous or provided with slots of small dimension through which the vapor or gas medium may flow radially inward. Internally, one axial end of the inner cylinder 47 is connected to a gas outlet tube 50 corresponding to the outlet 17 of the first described structure.

Centered within the inner cylinder 47 is a liquid outlet tube 51 which extends axially in concentric relation with the gas outlet tube 50. Within the axial length of the chamber 49 the liquid outlet tube 51 is provided with a mouth 52, which in cross section is in the form of a partial spiral, curving outward through the inner cylinder 47.

The radially outer wall of the mouth 52 terminates in a lip 53 so located that the entrance of the mouth 52 faces toward the direction of the flow of the vapor-liquid mixture which enters the chamber 49. The entrance end of the mouth 52 forms a capture slot 54 dimensioned to collect the liquid metal portion of the mixture.

Magnets 58 confront the axial ends of the chamber 49 outside the end plates 48. Output conductors 56 and 57 are electrically connected, respectively, to the outer cylinder 46 and the inner cylinder 47.

Operation of the arrangement shown in FIGURES 9 and 10 is as follows:

The vapor-liquid mixture rotates at high velocity within the chamber 49. Although the mixture contains gas or vapor, the chamber length is sufficient to maintain the gas concentration low enough for good conductivity, so that, in effect, there is provided a rotating conductor between the cylinders 46 and 47 and within the magnetic field between the magnets 58.

The gas or vapor continuously diffuses through the inner cylinder 47. The liquid metal, as it loses velocity, flows toward the inner cylinder 47 and is eventually collected by the capture slot 54 which extends part or all of the axial length of the chamber 49.

While particular embodiments of this invention have been shown and described, it is not intended to limit the same to the exact details of the constructions set forth, and it embraces such changes, modifications, and equivalents of the parts and their formation and arrangement as come within the purview of the appended claims.

I claim:

1. A method of producing electrical energy, characterized by:
   (a) mixing a heated conductive liquid medium and a condensed vapor medium at a temperature to vaporize said condensate;
   (b) expanding and accelerating the mixture thereby to impart high velocity to said liquid medium;
   (c) separating the liquid medium from the vapor medium to form a liquid medium stream continuing to travel at high velocity;
   (d) and passing said conductive liquid medium stream through a magnetic field to generate electrical energy.

2. A method of producing electrical energy, characterized by:
   (a) mixing a heated conductive liquid medium and a condensed vapor medium at a temperature to vaporize said condensate;
   (b) expanding and accelerating the mixture thereby to impart high velocity to said liquid medium;
   (c) separating the liquid medium from the vapor medium to form a liquid medium stream continuing to travel at high velocity;
   (d) condensing the separated vapor medium;
   (e) passing said conductive liquid medium stream through a magnetic field to generate electrical energy;
   (f) decelerating said liquid medium;
   (g) applying thermal energy to said liquid medium;
   (h) and remixing said heated liquid medium and condensed vapor medium.

3. A method of producing electrical energy, characterized by:
   (a) mixing a metal and a propelling fluid, which is inert to said metal, at a temperature above the melting point of said metal and the vaporizing point of said propelling fluid to produce a conductive liquid-propelling vapor mixture;
   (b) expanding and accelerating said mixture to impart high velocity to said conductive liquid;
   (c) passing at least said conductive liquid through a magnetic field to generate electrical energy in said conductive liquid;
   (d) and conducting said electrical energy from said conductive liquid.

4. A method of producing electrical energy, characterized by:
   (a) mixing a metal and a propelling fluid, which is inert to said metal, at a temperature above the melting point of said metal and the vaporizing point of said propelling fluid to produce a conductive liquid-propelling vapor mixture;
   (b) expanding and accelerating said mixture to impart high velocity to said conductive liquid;
   (c) passing at least said conductive liquid through a magnetic field to generate electrical energy in said conductive liquid;
   (d) conducting said electrical energy from said conductive liquid;
   (e) separating said conductive liquid and propelling vapor;
   (f) decelerating said conductive liquid;
   (g) condensing said propelling vapor;
   (h) and recirculating said separated liquid and vapor to the point of mixing.

5. An apparatus for producing electrical energy, comprising:
   (a) an electrically conductive medium;
   (b) means for supplying thermal energy to said conductive medium to maintain said conductive medium in a liquid state;

(c) a propelling medium adapted, when mixed with said liquid conductive medium, to vaporize;

(d) means for mixing said mediums to produce a vapor-liquid mixture;

(e) a nozzle for expanding said mixture thereby to accelerate said liquid medium;

(f) means for separating said mediums;

(g) means defining a flow path for each of said mediums from said separating means to said mixing means including a diffuser to decelerate said liquid medium, said thermal energy-supplying means being interposed in at least one of said flow paths;

(h) means for establishing a magnetic field in the region of said accelerated conductive liquid medium, whereby, on flow of said liquid medium therethrough, electrical energy is generated in said medium;

(i) and conductors connected to said medium for flow of electrical energy therefrom.

6. An apparatus for producing electrical energy, comprising:

(a) a first closed system for circulating a heated conductive liquid medium;

(b) a second closed system for circulating a propelling fluid medium capable of vaporizing when mixed with the liquid medium;

(c) said circulating systems having in common a mixer for said mediums to vaporize said propelling fluid medium, a nozzle for expanding and accelerating said mediums to cause said liquid medium to move at high velocity, and a separator for returning said mediums to their respective systems;

(d) means for producing a magnetic field in a region wherein said liquid medium is moving at high velocity to induce electrical current therein;

(e) and conductors electrically connected with said moving liquid medium for flow of electrical current therefrom.

7. An apparatus as set forth in claim 6, wherein:

(a) said separator includes a cone against the apex of which the mixture issuing from said nozzle impinges to cause said liquid medium to flow as a film toward its base, and means defining a circular capture slot to receive the liquid medium;

(b) and said first system includes means defining a passage in the form of an axially split cylinder to receive the liquid medium from said capture slot for axial flow therethrough, said passage being disposed in said magnetic field, whereby said liquid medium therein forms a solenoid element.

8. An apparatus as set forth in claim 6, wherein:

(a) said separator includes a cone against the apex of which the mixture issuing from said nozzle impinges to cause said liquid medium to flow as a film toward its base, and means defining a circular capture slot to receive the liquid medium;

(b) said first system includes means defining a plurality of passageways grouped in a circle;

(c) and said magnetic field producing means is disposed internally and externally of said passageways.

9. An apparatus as set forth in claim 6, wherein:

(a) said separator includes radially outer and radially inner cylindrical walls and end walls defining a chamber, said radially inner wall being porous for passage of said propelling medium in its vapor state therethrough, said separator also includes a discharge tube for said liquid medium disposed within said inner wall, and a collector mouth extends from said discharge tube through said inner wall into said chamber;

(b) said nozzle being positioned for tangential discharge of said mixed propelling and liquid mediums into said chamber for rotation of said mediums therein;

(c) said chamber is disposed within said magnetic field;

(d) and the inner and outer walls of said chamber form said conductors for flow of electrical current from said chamber.

10. A method of producing electrical energy, characterized by:

(a) mixing a conductive liquid medium and a vapor medium;

(b) expanding and accelerating the mixture thereby to impart high velocity to said liquid medium;

(c) separating the liquid medium from the vapor medium to form a liquid medium stream continuing to travel at high velocity;

(d) and passing said conductive liquid medium stream through a magnetic field to generate electrical energy.

11. An apparatus for producing electrical energy, comprising:

(a) a first closed system for circulating a conductive liquid medium;

(b) a second closed system for circulating a propelling fluid medium;

(c) said circulating systems having in common a mixer for said mediums, a nozzle for expanding and accelerating said mediums to cause said liquid medium to move at high velocity, and a separator for returning said mediums to their respective systems.

References Cited by the Examiner

FOREIGN PATENTS 841,613   6/52   Germany.

MILTON O. HIRSHFIELD, *Primary Examiner.*

DAVID X. SLINEY, *Examiner.*